(12) United States Patent
Lloyd, III

(10) Patent No.: US 8,403,283 B2
(45) Date of Patent: Mar. 26, 2013

(54) CLAMP FOR ATTACHING A BARRICADE TO A BALUSTRADE

(75) Inventor: Kent Sterrett Lloyd, III, Rocky Mount, NC (US)

(73) Assignee: Draka Elevator Products, Inc., Rocky Mount, NC (US)

( * ) Notice: Subject to any disclaimer, the term of this patent is extended or adjusted under 35 U.S.C. 154(b) by 470 days.

(21) Appl. No.: 12/707,839

(22) Filed: Feb. 18, 2010

(65) Prior Publication Data

US 2011/0198466 A1   Aug. 18, 2011

(51) Int. Cl.
*E06C 7/00* (2006.01)

(52) U.S. Cl. ............ 248/316.1; 248/229.14; 248/228.5

(58) Field of Classification Search .............. 248/316.1, 248/316.4, 316.6, 316.7, 316.8, 229.12, 229.14, 248/229.22, 229.24, 228.5, 230.5, 231.61, 248/231.41, 228.3, 230.3, 225.11, 223.41, 248/220.22, 220.21, 689; 403/354, 375

See application file for complete search history.

(56) References Cited

U.S. PATENT DOCUMENTS

| | | | | |
|---|---|---|---|---|
| 5,060,260 A * | 10/1991 | O'Connell | ................... | 379/454 |
| 5,836,563 A * | 11/1998 | Hsin-Yung | ................. | 248/316.4 |
| 7,401,755 B2 * | 7/2008 | Wu | ........................... | 248/346.07 |
| 7,418,097 B2 * | 8/2008 | Chang | ........................... | 379/446 |
| 7,828,259 B2 * | 11/2010 | Wang et al. | ................. | 248/316.4 |
| 7,891,739 B2 * | 2/2011 | Cramer | ..................... | 297/440.2 |

* cited by examiner

*Primary Examiner* — Terrell McKinnon
*Assistant Examiner* — Steven Marsh
(74) *Attorney, Agent, or Firm* — James G. Passe; Passe Intellectual Property, LLC

(57) ABSTRACT

The present invention relates to an adjustable clamping device that allows a barricade that is in use with an escalator or moving sidewalk to be attached to one another.

8 Claims, 5 Drawing Sheets

CLAMP FOR ATTACHING A BARRICADE TO A BALUSTRADE

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

1. Field of the Invention

The present invention relates to a clamping device. In particular, the present invention relates to a clamping device that allows a barricade in use with an escalator or moving sidewalk to be attached to the balustrade.

2. Description of Related Art

When an escalator or moving sidewalk is being worked on or is not working, it is probably at its most dangerous. Most countries, including the United States, mandate that a barricade be used to prevent the public from entering the walkway during such times. In addition, many countries mandate that barricades used with escalators and moving sidewalks must be attached to the balustrade to prevent the barricade from being moved or falling during use.

The current devices for attaching a barricade to the balustrade include suction cups and clamping devices, which require complicated tightening and loosening means. They do not appear to be in compliance with the current standards and pose a safety concern, as well as the opportunity for injury or liability on the part of the escalator owner. Accordingly, new means for attachment are in constant need.

BRIEF SUMMARY OF THE INVENTION

The present invention relates to a clamping device to be used with an escalator barricade that comprises and easy on/off mechanism to both attach and release the clamp.

Accordingly, one embodiment of the present invention is a clamping device for attaching an escalator barricade to the escalator balustrade comprising:
  a) a first clamp half comprising a horizontal body portion having a first end and second end, having a clamping arm mounted on the top portion of the first end and a handle portion mounted on the bottom portion of the first end there being a longitudinal slot through the horizontal body portion from about the first end to the second end and a longitudinal groove positioned beneath the longitudinal slot on a face of the horizontal body and having a series of stop ridges positioned along the groove;
  b) a second clamp half comprising a horizontal body portion having a first and second end and having a clamping arm mounted on the top portion of the second end and a handle portion mounted on the bottom portion of the second end there being a plurality of posts on a face of the horizontal body for engaging the first clamp half slot and sliding therethrough; and
  c) a locking lever actuator for positioning between the first clamp half horizontal body face and the second clamp half horizontal body face, such that it engages the series of stop ridges for adjusting the distance between the clamping arms in a locking adjustable manner.

DETAILED DESCRIPTION OF THE INVENTION

Figure 1:
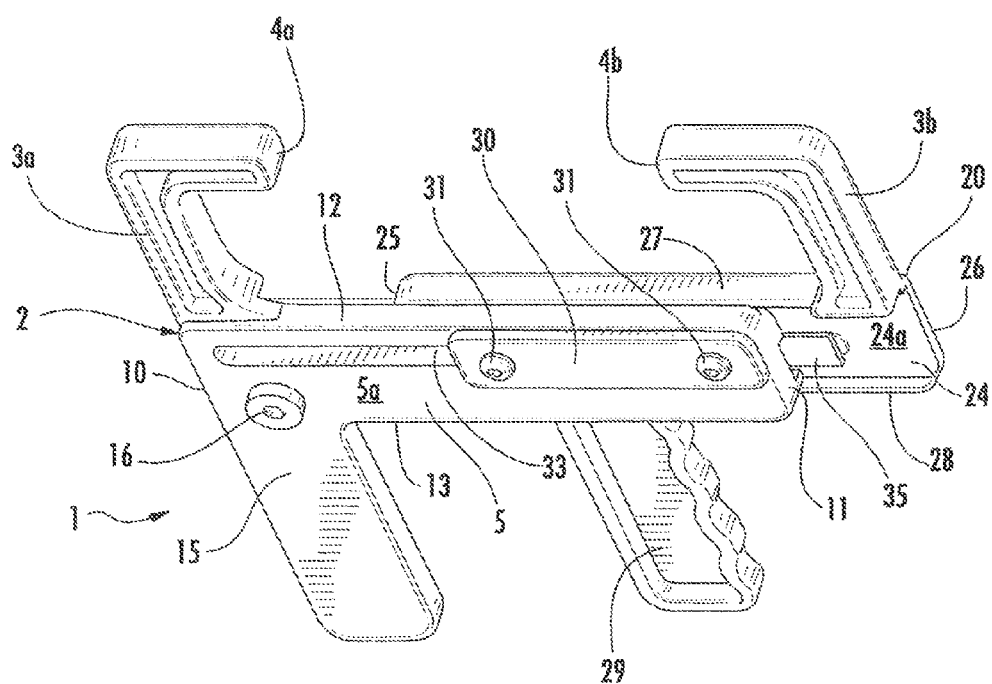
FIG. 1 is a back perspective of the present invention clamp.

While this invention is susceptible to embodiment in many different forms, there is shown in the drawings and will herein, be described in detail specific embodiments, with the understanding that the present disclosure of such embodiments, is to be considered as an example of the principles, and not intended to limit the invention to the specific embodiments shown and described. In the description below, like reference numerals are used to describe the same, similar or corresponding parts in the several views of the drawings. This detailed description defines the meaning of the terms used herein, and specifically describes embodiments, in order for those skilled in the art to practice the invention.

DEFINITIONS

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", and "an embodiment", or similar terms means that a particular feature, structure, or characteristic described in connection with the embodiment is included in at least one embodiment of the present invention. Thus, the appearances of such phrases, or in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps, or acts are in some way inherently mutually exclusive.

The drawings featured in the figures are for the purpose of illustrating certain convenient embodiments of the present invention, and are not to be considered as limitation thereto. The term "means", preceding a present participle of an operation, indicates a desired function for which there is one or more embodiments, i.e., one or more methods, devices, or apparatuses for achieving the desired function, and that one skilled in the art could select from these or their equivalent in view of the disclosure herein, and use of the term "means" is not intended to be limiting.

As used herein, a "clamping device" is a device, which is attached to a barricade for the purpose of attaching the barricade to an escalator (including moving walkways) balustrade as required by current US mandates. Current barricade sizes involve movable walls for isolating the area around the entrance and exit to the escalator, such that they cannot easily be entered into with the barricade in place. The clamping device makes it difficult or impossible to accidently move the barricade in such a way that an individual could enter the escalator.

The present invention clamping device comprises two halves each having a clamping arm. The two halves are held together and move in registry with one another to engage and disengage the clamping arms. The first clamp half has a horizontal body. Positioned on the first end on the top portion is a first clamping arm. A "clamping arm" is an arm with a tip (which can be coated as desired) wherein, the two tips from each half coming together form the clamping pressure to grab a balustrade. On the bottom portion of the horizontal body at the first end, there is mounted a handle. In one embodiment, the handle is mounted directly below the clamping arm. The handle is designed to be grasped by the human hand.

The horizontal body has a slot running all the way through the body from face to back. It is positioned in essentially the upper half of the body and runs from roughly the first end to the second end with enough room left at each end, so that the slot does not cut the body in two. Beneath the slot is a series of ridges, teeth or other grabbing points. These points become stops that the clamp can be fixed at, when the two halves are moved together or apart as further described later herein.

The second clamp also has a similar horizontal body with a face side designed to move in registry with the first half. There is a second clamping arm with an optionally coated grabbing tip on the top portion second end of the body and a handle on the second end on the lower portion of the body. Likewise, an embodiment of the present invention is where the handle is positioned essentially below the gripping arm. The horizontal body half in one embodiment has a plurality of posts positioned such that, when the faces of the first and second clamp halves are placed in registry the posts are positioned in the slot, so that the two faces can move against one another and remain in registry. By "in registry" is meant that the bodies can move with their opposite (first end of the first half and second end of the second half) ends moving toward and away from each other to cause the clamp arms to move toward and away from each other. It is therefore obvious from this disclosure that the clamp arms must be positioned such that, when this movement occurs the clamping arms can come together to grab a balustrade or move apart to release. More will become clearer from the embodiment in the figures which follow.

The clamping halves can be held in registry by any convenient means. In one such embodiment, there is a plate positioned on the back side of the first clamp half attached to the posts positioned in the first clamp half slot. The plate will keep the halves from separating and a plurality of posts (such as 2) will keep the bodies and the clamp arms moving in the proper plane to have a clamping action of the arms.

In between the clamp halves is positioned a locking lever actuator. An actuator is a device for engaging the points on the first clamp half to lock the halves in relative position, and thus lock the clamping arms in position. This sort of reached arm can be spring loaded, and in one embodiment has a button position to engage and disengage the actuator. In other embodiments, the slant of the points on the first clamp arm can be such that the clamp can be engaged merely by moving the two handles toward each other. The clamp is released by depressing a button, which disengages the actuator and allows the clamp halves to slide against one another.

In order to attach the clamp to the barricade, any convenient means can be used, such as ties, clamps, or the like. In one embodiment (shown in the drawings), there is a bar clamp attached to the back of the first clamp half. This type of clamp can be screwed tight over a bar on the barricaded for securely fastening the device to the barricade. The clamp can be attached or built into a barricade as well, so that the clamp can be used with an existing barricade or made into new barricades.

Now referring to the drawings, FIG. 1 depicts a clamping device 1 of the present invention in the open position. The view in FIG. 1 is from the back side 5*a* of the first clamping half 2. The first clamping half 2 consists of a horizontal body 5 having a first end 10, a second end 11, a top 12, and a bottom 13. Attached to the first end top is clamping arm 3*a* with clamping tip 4*a*. This tip can be covered by material (rubber, polymer, or the like) that improves gripping or left uncovered as shown. There is a handle for grasping by a human hand positioned on the first side 10 of horizontal body 5 on the bottom side 13. Note this embodiment wherein, the arm 3*a* and handle 15 are positioned essentially right over one another with the body 2 in between. This present embodiment depicts a screw hole 16 for attaching a device for attaching the clamp 1 to a barricade. The slot 33 in the horizontal body is partially shown. It extends from the back side 5*a* to the body face not shown in this view. The second clamp half 20 consists of a horizontal body 24, which has a first side 25, a second side 26, a top 27, and a bottom 28. Positioned on the top 27 of the horizontal body 24 is clamping arm 3*b* with tip 4*b*. The face side 24*a* of horizontal body 24 can be partially seen as can a portion of actuator 35. It should be noticed that each of the arms are positioned on the top of the respective horizontal bodies slightly off to the face side of each clamp half, such that the tips would touch at least partially, if brought together by sliding the clamp halves handles together. The horizontal body 24 also has handle 29. The handle 29 is on the bottom side 28 but in this embodiment, more towards the middle and not directly beneath arm 3*b*.

Plate 30 holds the clamp halves 2 and 24 in registry as will be further seen in other figures. The plate is held in place by screws 31 which are attached to posts not seen in this view. Also seen in this view is a portion of the actuator, which disengages the clamp after it has been positioned to clamp.

Figure 2:
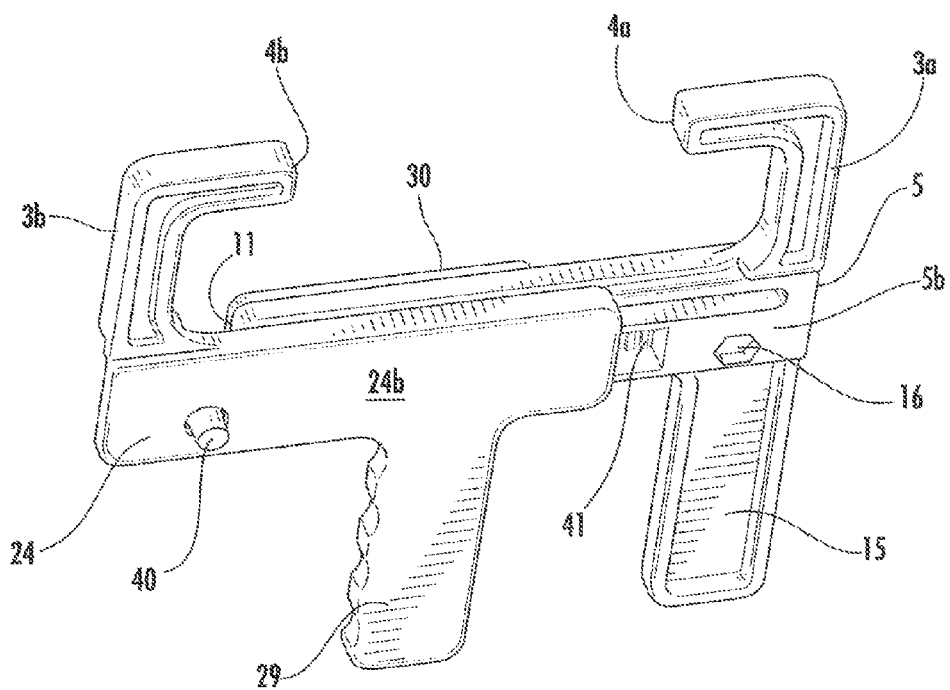
FIG. 2 is a front perspective of the present invention clamp.

FIG. 2 is a view of the opposite side of the clamp from what is shown in the first figure. In this view, the back side 24*b* of the second clamp half 24 can be seen as can the face side 5*b* of first clamp half. As can be relatively seen, the faces of the two horizontal bodies face each other. They are designed to move horizontally in register to one another by moving the handles 15 and 29 closer together and after releasing the ratchet by pressing button 40 by moving the handles 15 and 29 apart. The button 40 is the release button for actuator 35. In this view, one can see the ratchet points 41, which the actuator 35 can move into to give locking positions to clamp 1. While only a portion of the ratchets are shown, they can extend horizontally on body face 5*b* most of the way or all the way toward end 11.

Figure 3:
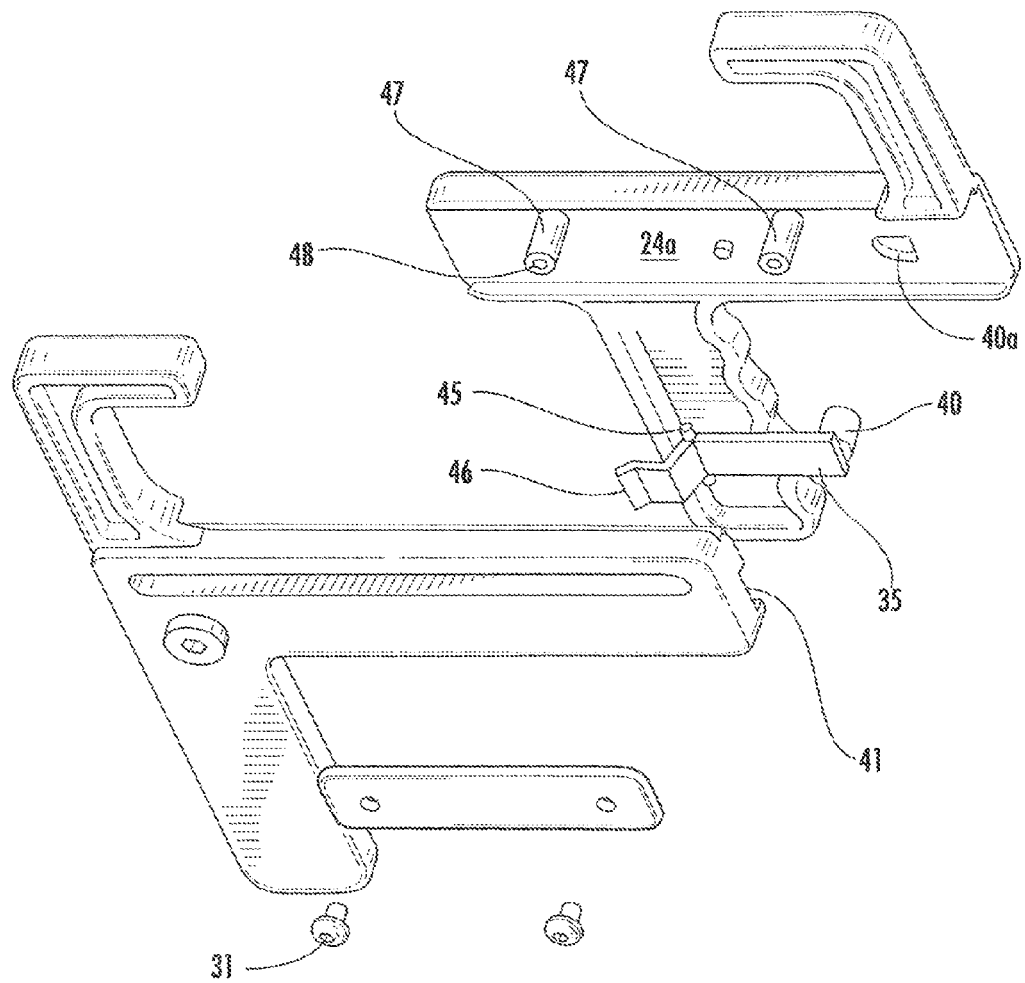
FIG. 3 is an exploded view of an embodiment of the present invention.

FIG. 3 is an exploded view of the clamp 1 from the same view as shown in FIG. 1. The exploded view depicts the means for assembly of the present invention clamp 1. Note that posts 47 on the face 24*a* can now be seen as well as hole 40*a* designed to accommodate button 40, when the clamp is assembled. This view also shows the entire actuator 35 comprising the button 40, the pivoting spring and the lock tip 46. The lock tip 46 engages points 41 for locking the device, in a particular, open or closed configuration.

Figure 4:
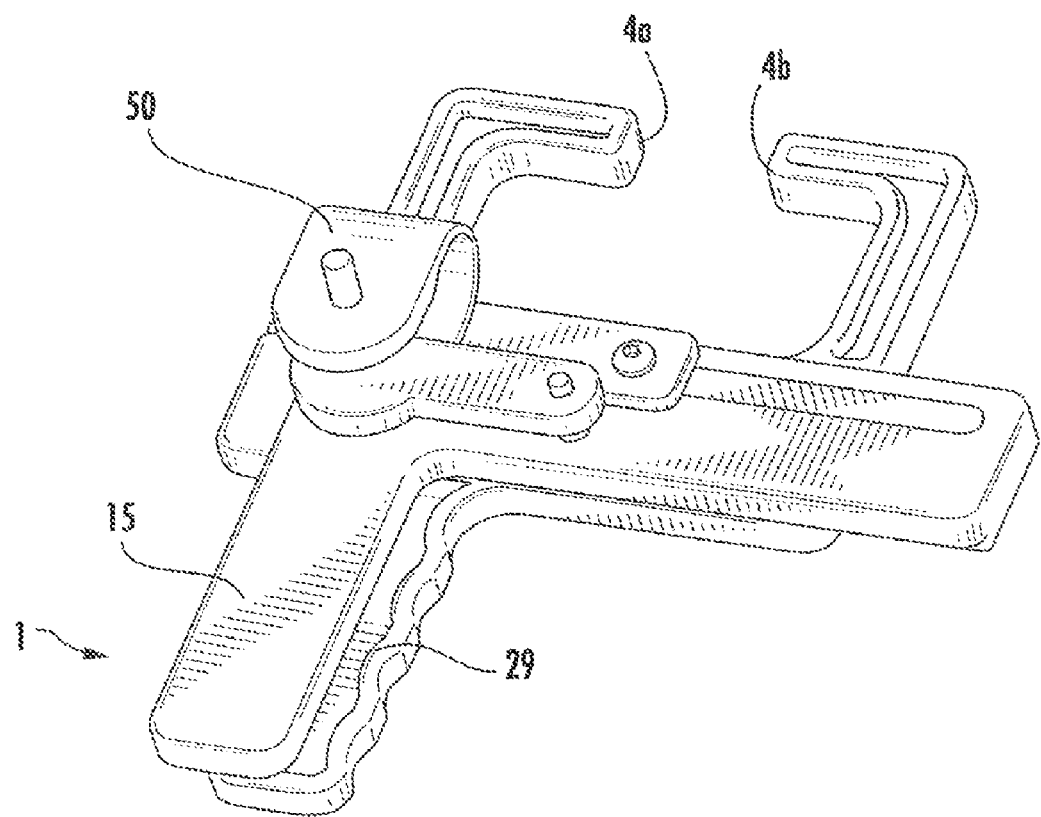
FIG. 4 is a back perspective of the present invention showing a barricade attachment device attached to the clamp.

FIG. 4 depicts the clamp 1 in a closed position. A closed position is a position, where the clamp 1 would be gripping a balustrade. Note that handles 15 and 29 have moved together. This would be done by grasping both and squeezing them till they go from the position of FIG. 1 to the position of FIG. 4. Also, depicted in this view is a barricade attachment device 50. This device can be attached to a pipe on the barricade thus, the clamp can attach to both the barricade and the balustrade.

Figure 5:
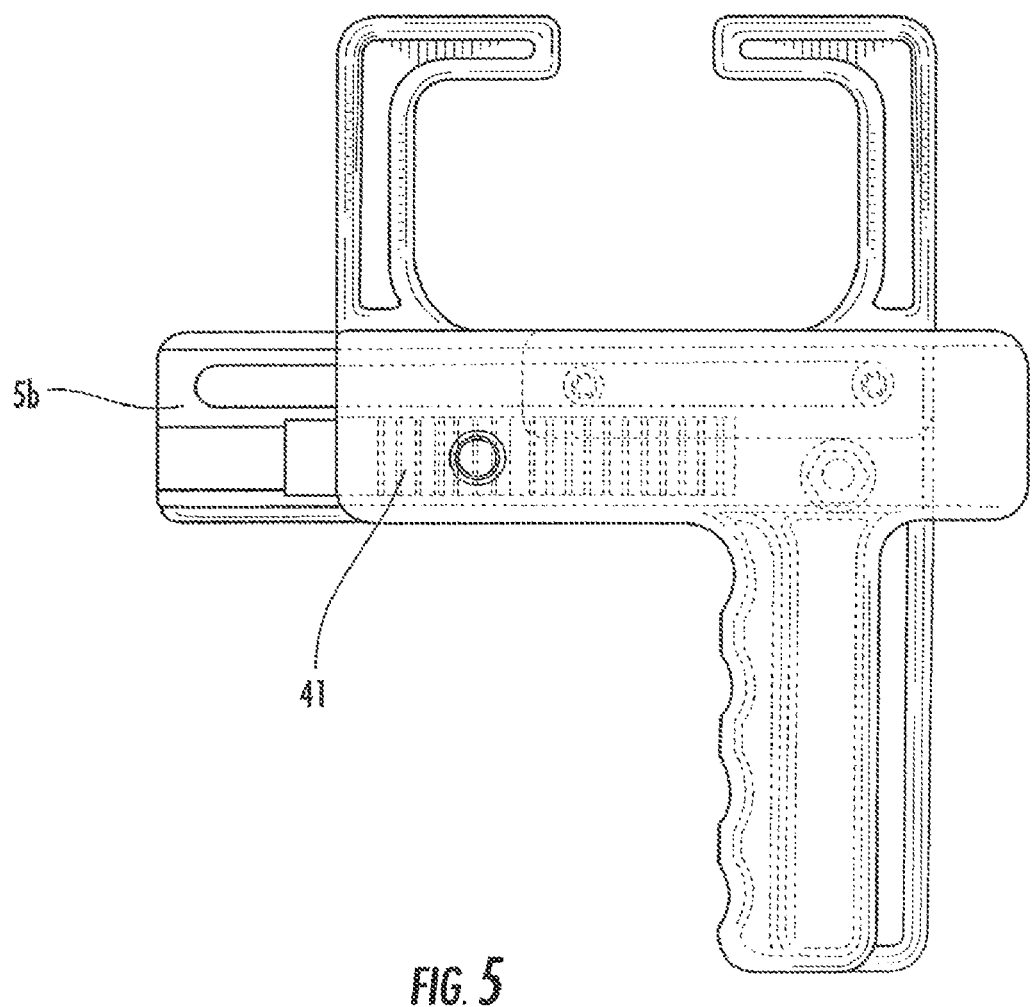
FIG. 5 is a side view of the first clamp half.

FIG. 5 depicts the face of the first clamp half. In this view, all of points 41 can be cleanly seen as going from the first end to the second end.

What is claimed is:

1. A clamping device for attaching an escalator barricade to the escalator balustrade comprising:
   a) a first clamp half comprising a horizontal body portion having a first end and second end having a clamping arm mounted on a top portion of the first end and a handle portion mounted on a bottom portion of the first end there being a longitudinal slot through the horizontal body portion from about the first end to the second end and a longitudinal groove positioned beneath the longitudinal slot on a face of the horizontal body and having a series of stop ridges positioned along the groove;
   b) a second clamp half comprising a horizontal body portion having a first and second end and having a clamping arm mounted on a top portion of the second end and a handle portion mounted on a bottom portion of the second end there being a plurality of posts on a face of the horizontal body for engaging the first clamp half slot and sliding therethrough; and
   c) a locking lever actuator for positioning between the first clamp half horizontal body face and the second clamp half horizontal body face such that it engages the series of stop ridges for adjusting the distance between the clamping arms in a locking adjustable manner.

2. A clamping device according to claim 1 wherein the two faces are held in spaced registry by attaching a holding plate to the plurality of posts while they are engaged in the slot of the first clamp half.

3. A clamping device of claim 1 which further comprises a barricade mounting device.

4. A clamping device according to claim 3 wherein the mounting device is a pipe clamp.

5. A clamping device according to claim 1 wherein the locking lever actuator is spring activated.

6. A clamping device according to claim 5 where the locking lever actuator is released by a button positioned in the second clamp half body.

7. A clamping device according to claim 1 which is attached to a barricade and to the balustrade of an escalator or moving sidewalk.

8. A clamping device according to claim 1 wherein there are grip tip coverings on the clamping arms.

* * * * *